(12) United States Patent
Leeworthy (10) Patent No.: US 10,555,464 B1
(45) Date of Patent: Feb. 11, 2020

(54) SELF-REGULATING, PLANT WATERING, INSERT ASSEMBLY FOR GROWING CONTAINERS

(71) Applicant: Daryl A. Leeworthy, Bradenton, FL (US)

(72) Inventor: Daryl A. Leeworthy, Bradenton, FL (US)

( * ) Notice: Subject to any disclaimer, the term of this patent is extended or adjusted under 35 U.S.C. 154(b) by 337 days.

(21) Appl. No.: 14/696,481

(22) Filed: Apr. 26, 2015

(51) Int. Cl.
*A01G 27/04* (2006.01)
*A01G 9/02* (2018.01)
*A01G 27/00* (2006.01)

(52) U.S. Cl.
CPC .............. *A01G 27/04* (2013.01); *A01G 9/02* (2013.01); *A01G 27/005* (2013.01)

(58) Field of Classification Search
CPC .................................. A01G 27/04; A01G 27/06
See application file for complete search history.

(56) References Cited

U.S. PATENT DOCUMENTS

| | | | | |
|---|---|---|---|---|
| 7,171,783 B1* | 2/2007 | Fidotti | ............. | A01G 27/04 47/81 |
| 2006/0207175 A1* | 9/2006 | Wu | ............. | A01G 27/02 47/79 |
| 2010/0162624 A1* | 7/2010 | Bradley | ............. | A01G 9/02 47/66.7 |
| 2011/0131879 A1* | 6/2011 | Altendorfer | ............. | A01G 27/04 47/81 |
| 2013/0067812 A1* | 3/2013 | Masters | ............. | A01G 27/02 47/81 |

* cited by examiner

*Primary Examiner* — Jessica B Wong
(74) *Attorney, Agent, or Firm* — Dorothy S. Morse (57) ABSTRACT

An insert assembly converting an otherwise discarded plastic drum or bucket, and other non-corroding and waterproof containers, into a self-regulating, watering container for growing plants. It has a platform to support grow media in which plant roots become established and receive water and/or nutrients. It also has at least one cylinder, which supports the platform and contains additional grow media. Furthermore, the insert assembly preferably uses open or closed cell gasket material around the perimeter edge of the platform, that assists in maintaining separation between the grow media and the water and/or nutrient in the reservoir under the platform in the bottom portion of the bucket, drum, or other container. Grow media in the cylinder provides fluid communication with the water/nutrient in the reservoir and the grow media supported by the platform via small openings, transferring water and/or nutrients from the reservoir to plant roots via a wicking effect.

20 Claims, 6 Drawing Sheets

SELF-REGULATING, PLANT WATERING, INSERT ASSEMBLY FOR GROWING CONTAINERS

CROSS-REFERENCES TO RELATED APPLICATIONS

"None"

BACKGROUND OF THE INVENTION

Field of the Invention

The present invention relates to wicking planters.

Description of the Related Art

There are many inventions for plants and planting that use the physical phenomenon of the "wicking effect", where an absorbent material is used to transfer water from one location to another in a variety of pots and other containers having different structural components and shapes. Most of these inventions are complicated in nature, some requiring electrical or mechanical energy to work, and some not simple enough in design for practical application in an average garden setting or by those with limited time or understanding in the use of such mechanisms.

This invention, illustrated herein in first and second preferred embodiments, was created to solve a number of problems, including making it more user friendly by avoiding the use of electricity or mechanical energy and requiring little or no maintenance after the initial setup. In addition, this invention was designed to specifically utilize an already abundant resource of discarded 55-gallon plastic drums and plastic utility buckets having a volume of approximately 5-gallons, although a variety of other reusable containers of various sizes and shapes (not shown) can also be substituted. The present invention can be manufactured to fit a variety of containers, quickly and easily converting them into growing containers, with a design requiring little or no maintenance by the user. Addition of the present invention makes the lower portion of the container into a water or water-nutrient reservoir, thus providing a steady supply of water or a water-nutrient mixture to the plant roots for an extended period of time and promoting optimal plant growth without oversaturation.

In contrast to the prior art, a unique feature of the present invention is its use of an open or closed cell gasket material, depending on the application. The gasket material is positioned around the outside edge of its top platform, creating a snug seal between the platform and container wall to prevent the grow media (not shown) on and above the platform from entering the water reservoir below. An open cell gasket material works best in larger containers used outdoors, by allowing a high volume of rainwater to pass through it and into the reservoir, as well as via the wicking cylinders, filling the water reservoir without over saturating the grow media supported by the platform. A closed cell gasket material is sufficient for smaller containers because the reduced volume of rainwater can easily reach the water reservoir through the wicking cylinder(s) alone. For plants kept outdoors, the present invention allows rainwater to replenish the reservoir's water supply, creating an even more maintenance-free growing container. A simple over-fill prevention opening in the side of the container prevents the risk of plant root damage from over watering.

Figure 1:
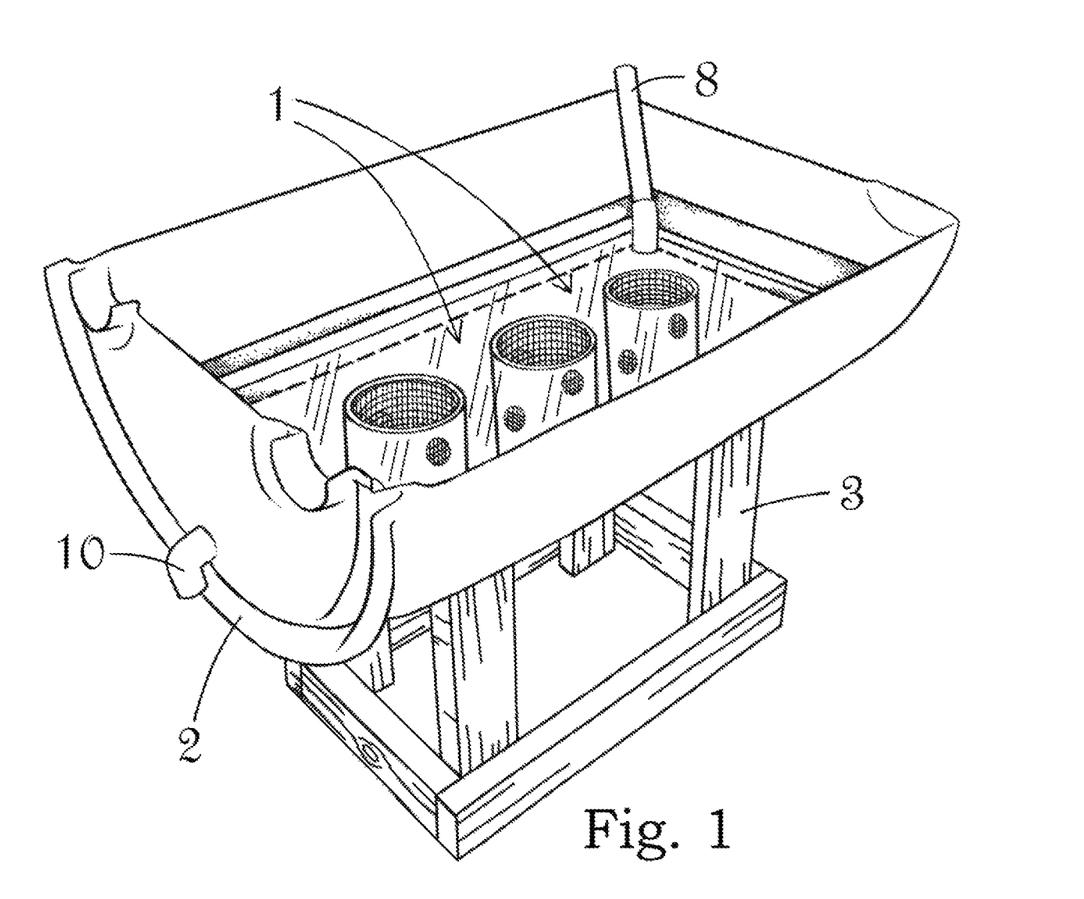
FIG. 1 is a perspective view from the top of a first preferred embodiment of the present invention supported within one-half of a 55-gallon drum placed on an ergonomically designed stand, and showing the present invention as an assembly consisting of a platform for supporting a grow media and three cylinders extending from and below the platform to the interior bottom surface of the drum, providing support for the platform. For clarity of invention structure, the grow media in the cylinders providing a means by which water or a water-nutrient mixture can "wick" upwardly from the reservoir and through the cylinder to plant roots is not shown.

It is considered within the scope of this invention, for the stand shown in FIG. 1, to have a different shape and or size and be made from materials other than wood. The primary objectives of the stand are to provide means for elevating the drum, making it more ergonomic to use, and also provide a means for leveling the drum to maximize its reservoir capacity and keep the open side of the drum in an upward orientation for maximum exposure to light.

In addition to a platform (see FIG. 2) that supports a plant grow media, at least one cylinder supports the platform. Each cylinder also has a top opening that allows grow media to fill its interior. Thus, present invention cylinders support the platform as well as create a means by which the water or water-nutrient mixture in the reservoir can wick in an upward direction through the grow media in the cylinders and into the grow media on and above the platform that surrounds plant roots. A structural characteristic in the cylinders, such as tiny holes in the cylinder wall or openings therein with a screen or mesh material around the inside or outside of each cylinder used, prevents grow media from exiting the cylinder and getting into the water reservoir, while concurrently allowing the upward transfer of water from the reservoir to the grow media and plant roots. The selected structural characteristic maintains the continuity of the grow media for providing the wicking effect, as well as preventing the grow media from entering the reservoir and reducing the volume of water or water-nutrient mixture it can hold.

Furthermore, although not limited hereto, the present invention is preferably used in conjunction with containers such as 55-gallon reusable plastic drums and approximate 5-gallon buckets, often sent to landfills, thus giving them a new purpose for use and reducing environmental waste and pollution.

BRIEF SUMMARY OF THE INVENTION

The present invention provides a plant-watering assembly for placement into various containers, including reusable or recyclable containers, converting them into growing containers.

The assembled invention generally comprises a platform, at least one cylinder extending between the platform and the interior bottom surface of a growing container and also supporting the platform in a fixed position during use, openings in the cylinder wall that allow water to pass through it, grow media in the cylinder that is used for water transfer to and from the reservoir, and a gasket material which creates a seal between the platform and the interior wall of an associated growing container creating a lower water/water-nutrient reservoir. The function of the platform is to support grow media above it, which supports plant roots and facilitates their growth. A cylinder extending from and below the platform, and also having an open top end where the cylinder connects to the platform, receives grow media which thereafter functions as a wicking agent to transfer water or a water-nutrient mixture from below the platform to the plant roots above the platform.

The cylinder also creates a chamber below the platform between it and the container wall, which becomes a reservoir for water or a water-nutrient mixture, which can then pass through openings in the cylinder and be drawn upwards to the plant roots via the grow media in the cylinder and upon the platform. The cylinder wall openings are such that water can pass through them while containing substantially all of the grow media inside the cylinder. The gasket material functions to create a snug fit between the outer edge of the platform and inner wall of a container, also preventing the grow media from falling below the platform and entering the reservoir.

The most preferred use of the present invention is in conjunction with common containers such as 55-gallon drums and 5-gallon buckets, creating a repurposed use for them, where they may have otherwise been discarded into landfills.

Other objectives of this invention are the following:

a) Provide a simpler and more user-friendly means by which anyone with limited gardening knowledge can easily and successfully produce fruits and vegetables, eliminating a need for components requiring any electrical or mechanical energy.

b) Provide an ergonomically friendly way of having an elevated garden, reducing or eliminating joint and back pain associated with ground level gardening, and allowing easy access by those who are wheelchair bound.

c) Provide a way to maximize plant growth by providing means and a method of evenly and continuously supplying water to plant roots, greatly reducing the "rollercoaster" effect of plant growth, which may otherwise include growth "spurts" and "dormant" stages.

d) Reduce landfill waste by targeting the recycling potential of 55-gallon plastic drums and 5-gallon buckets (or any other abundant non-corrosive and waterproof container).

e) Reduce the amount of garden pest control needed, by creating a separate means in which to grow plants, virtually eliminating ground thriving pests from ever entering the grow container.

f) Maximize the effectiveness of fertilizers or plant nutrients by providing a means that retains these nutrients when added to grow media within the grow container.

g) Reduce the amount of excess fertilizer or plant nutrients entering and contaminating ground water supplies (aquifer), by confining these additives for use within the grow container.

h) Save money on plant nutrients and fertilizers by eliminating their waste, and directing all of it to plant roots.

i) Create a means by which a more efficient use of water/nutrient is achieved, by supplying water directly to the plant roots from below the root system rather than losing significant amounts of water/nutrient through evaporation and over saturation, as is typical when using conventional plant watering methods.

j) Reduce environmental impact in the use of herbicides and/or pesticides while maximizing their effectiveness, by being able to directly apply these substances where specifically needed on the plants, instead of applying them broadly to large ground areas around the plants.

k) Create a means by which one individual can easily manage a large gardening operation by greatly reducing the amount of time needed for plant care and maintenance, and creating more yield than would otherwise be possible by that individual in a conventional garden with in-ground plants.

BRIEF DESCRIPTION OF THE SEVERAL VIEWS OF THE DRAWING(S)

FIG. 5 is a perspective view from the top of a second preferred embodiment of the present invention, designed for use with a utility bucket having an approximate 5-gallon interior volume, or other generally cylindrical growing container, showing an assembly consisting of a platform for supporting a grow media and one cylinder supporting the platform, multiple openings in the cylinder wall, and a mesh material inside the cylinder wall and covering the openings to contain substantially all of the grow media inside the cylinder, while allowing water or a water-nutrient mixture to transfer through the openings and upwardly to plant roots above the platform, with FIG. 5 also showing a closed cell gasket material around the perimeter edge of the platform that creates a seal between the platform and the growing container wall, preventing the grow media from falling below the platform and into the reservoir space below the platform, and an overfill prevention hole below the gasket material.

FIG. 10 is a left side view of the repurposed half-drum growing container previously shown in FIG. 1, made from a 55-gallon drum cut lengthwise and optionally supported on an elevated stand, with FIG. 10 showing the first preferred embodiment of the present invention insert assembly within the half-drum growing container and having a horizontally-extending platform with gasket material surrounding its perimeter edge and at least one wicking cylinder extending below the platform, the bottom end of the one wicking cylinder visible in FIG. 10 is shown in contact with the interior bottom surface of the half-drum growing container, the total number of wicking cylinders present in the insert assembly in combination providing the platform's fixed support above the interior bottom surface of the half-drum growing container during plant growing use to allow water or water-nutrient added to the half-drum growing container below the platform to surround the cylinders and be available for wicking transport by individual quantities of grow media filling each wicking cylinder upward to plant roots supported by a separate additional quantity of grow media positioned on and above the platform, the platform's perimeter edge gasket material further being in contact with the four interior side walls of the half-drum growing container to block passage of the grow media located on and above the platform downwardly between the platform's perimeter edges and adjacent portions of the half-drum's interior side walls so that it does not enter and mix with the water or water-nutrient below the platform, the platform's perimeter edge gasket material additionally in outdoor applications configured to allow surplus rainwater present above the platform an opportunity to reach the reservoir to help replenish it.

DETAILED DESCRIPTION OF THE INVENTION

This invention (preferred embodiments 1, 1', or other similar/equivalent structures) were created to solve a number of problems in prior art growing containers, including making gardening more user friendly by avoiding the use of electrical or mechanical energy and requiring little or no maintenance after the initial setup. In addition, the present invention was specifically designed to repurpose an already abundant resource of 55-gallon plastic drums 2 and 5-gallon plastic buckets 2' that would otherwise likely be placed in landfills, although a variety of other containers (not shown) can also be employed. Thus, the present invention can be manufactured to fit a variety of non-corroding, waterproof containers, quickly and easily converting them into growing containers. The lower portion of each growing container (2, 2', or other) becomes a reservoir for water or a water-nutrient mixture (not shown), providing a steady supply thereof to the plant roots above the present invention platform for extended periods of time and promoting optimum plant growth without overwatering, that could otherwise damage plant roots. The first preferred embodiment 1 of this insert assembly invention is shown in FIGS. 1-4, and 10 and the second preferred embodiment 1' thereof is shown in FIGS. 5-9.

Figure 10:
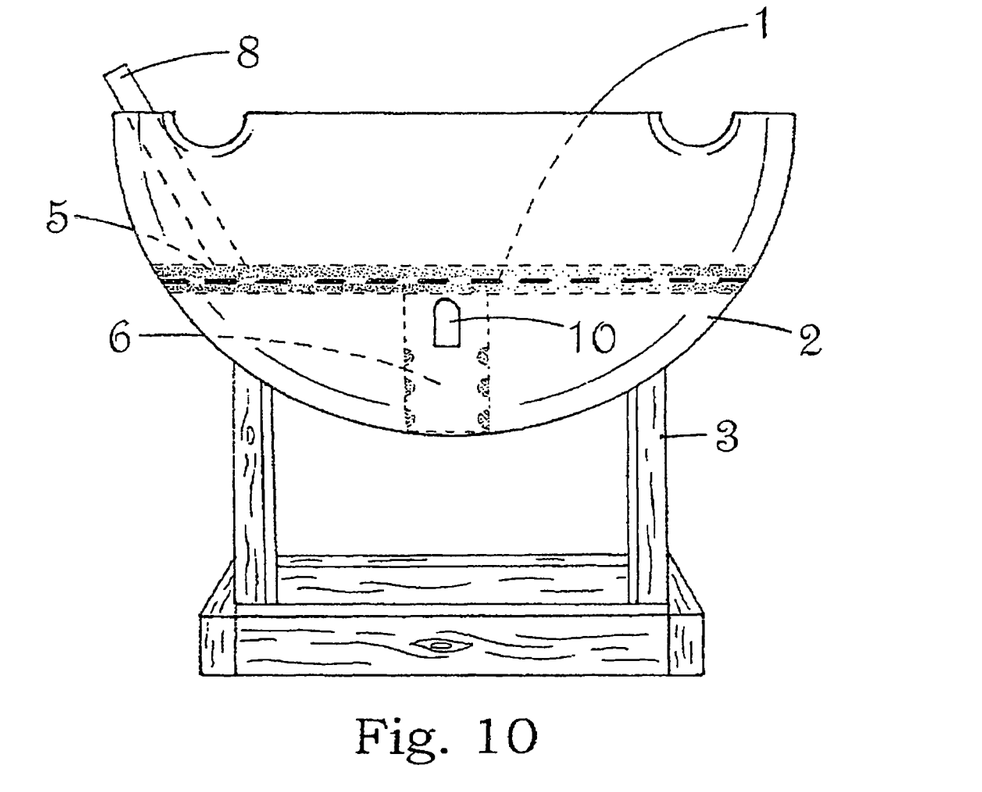

FIG. 1 is a near isometric view of the first preferred embodiment 1 of the present invention insert assembly positioned within one-half of a 55-gallon drum 2 that together create a plant-growing system with a bottom reservoir and wicking meant (at least one cylinder 6 filled with grow media) to transfer water or a water-nutrient mixture upward from the reservoir to plant roots (not shown) in a separate/additional quantity of prow media positioned above the platform 4 (see the number 4 marked in FIG. 2) and in fluid communication with the open top end of each cylinder 6. An important objective of the first preferred embodiment 1 is to create a means by which a user can easily repurpose a 55-gallon drum 2 and convert it into two self-watering, plant-growing containers. Drum 2 is cut lengthwise which maximizes the area in which plants can be grown, and when the user creates two growing containers out of one drum 2, the potential plant growing area is doubled. FIG. 1 also shows a stand 3 under and supporting drum 2, the purpose of which is to create a means by which the growing container (drum 2) can be elevated to make a more ergonomically friendly gardening apparatus for everyone, including wheelchair bound people. The structure, size, and configuration of stand 3 is not limited to that shown in FIG. 1, as long as stand 3 provides stable support for drum 2, adequate elevation, and is made from durable materials. FIG. 1 shows first preferred embodiment insert assembly 1 having the structure more clearly revealed in FIGS. 2-4 and 10, which includes a substantially horizontally extending platform 4, gasket material 5 completely around the perimeter edges of platform 4, and three upended cylinders 6 that each support platform 4 and contain a distinct and separate quantity of grow media for use as a wicking means for transferring water upwards from the water/nutrient reservoir under platform 4 and to plant roots (not shown) supported in an additional quantity of grow media (not shown) situated on and above platform 4. Although FIG. 1 shows three cylinders 6 aligned in a central row under platform 4, the positioning and number of cylinders 6 is not limited thereto. Also, cylinders 6 are not limited to the circular cross-section shown, and instead may have a rectangular, triangular, hexagonal, or other curvilinear configuration. FIG. 1 also shows a fill tube 8 providing an opening above and through the grow media (not shown) that is used to replenish the water or water-nutrient mixture in the reservoir below the platform 4 without disturbing plant roots or grow media. The placement and configuration of fill tube 8 is such to allow ease of access and yet not diminish the grow area by only slightly protruding above the grow media (not shown), in a position very close to the outer overfill prevention member 10 that regulates the addition of water by fill tube 8 or rain by preventing over saturation of the grow media (not shown) and eliminating the potential for root damage. Although FIG. 1 shows overfill prevention member 10 in the form of a tube, in the alternative, although not shown, overfill prevention member 10 could simply be an opening in drum 2, with or without a cap or fitting, and may have any cross-sectional configuration. In addition, more than one overfill prevention member 10 may be present FIG. 10 is a left side view of the first preferred embodiment of the present invention insert assembly 1 shown in FIG. 1, with FIG. 10 illustrating the present invention as it would be positioned inside one-half of a 55-gallon drum 2 split lengthwise, the cut open edge of drum 2 facing upward while its rounded bottom surface that in part defines a reservoir is shown in preferred contact with a stand 3 that places drum 2 in a conveniently elevated position during plant growing use. FIG. 10 further illustrates the horizontally-extending platform 4 of insert assembly 1 raised above the interior bottom surface of drum 2 by a cylinder 6 filled with fluid-wicking material (grow media, not shown), gasket material 5 around the perimeter edge of platform 4 blocks downward movement of the additional/separate quantity of grow media positioned on the platform 4 from moving downward past the platform 4 and into the reservoir. The platform 4 has a size and cross-sectional configuration allowing contact of the perimeter gasket material 5 with all four interior side surfaces of the drum 2 (front, back, left side, and right side), such platform 4 positioning thus defining and separating an upper plant growing area from a bottom fluid containing reservoir, with the quantity of grow media packed in the cylinders 6 providing upward fluid transfer via wicking from the reservoir to plant roots positioned in and supported by an additional/separate quantity of grow media on and above the platform.

Figure 2:
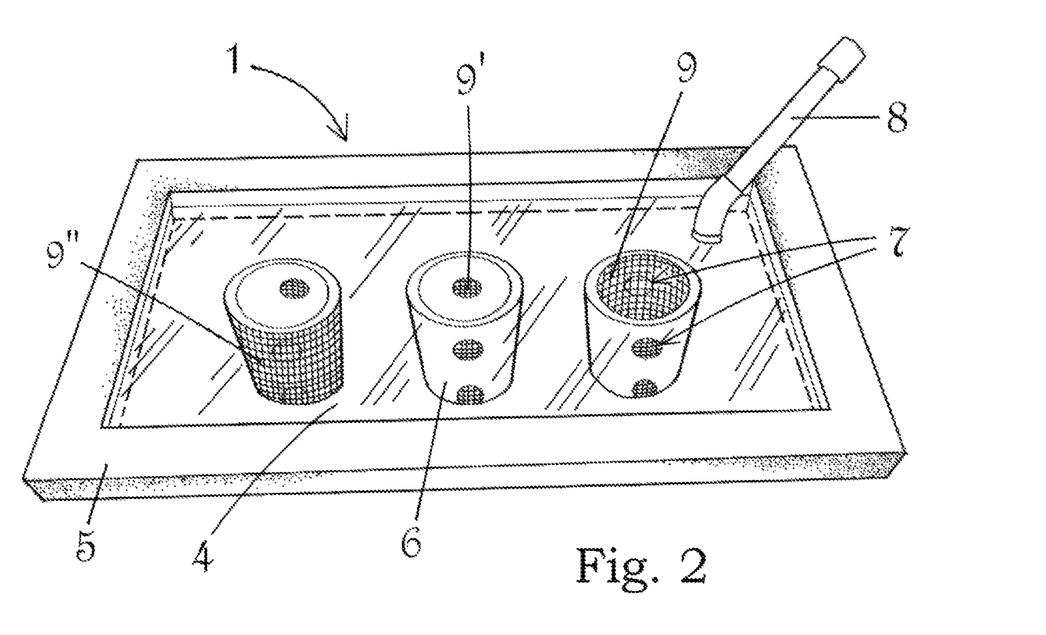
FIG. 2 is a perspective view from the top of the present invention insert assembly in FIG. 1, without the drum, showing the platform designed to support the grow media and a gasket material around its outer edge that creates a snug fit for the platform when it is positioned within the drum-half, three cylinders associated with the platform each representing a different contemplated structure for mesh that retains grow media inside the cylinder, a choice of mesh material applied to the inside or outside of the cylinder wall, or a cylinder wall with integral perforations, and also showing a fill-tube above the platform that is designed to provide an access by which needed water or a water-nutrient mixture can be added to the reservoir without disturbing plants, plant roots, or grow media.

FIG. 2 is a perspective view from the top of the first preferred embodiment 1 of the present invention with its main components illustrated and numbered. The purpose of platform 4 is to support a grow media (not shown) that holds plant roots so as to promote plant growth and root development. The open celled gasket material 5 around platform 4 creates a seal between the perimeter edge of platform 4 and the interior wall of drum 2, preventing the grow media from falling down into the reservoir space created in drum 2 below platform 4 and around cylinders 6, while allowing water (whether introduced naturally via rain or artificially via fill tube 8) to pass through the open cell gasket material 5, replenishing the reservoir while preventing root damage due to oversaturation of the grow media. The purpose of three or more cylinders 6 is to support the platform 4 creating a reservoir below, as well as to contain grow media which can then act as a wicking agent for transferring water or a water-nutrient mixture from the reservoir upwardly to the grow media above and on the platform 4 and the plant roots contained therein. The purpose of the openings 7 in cylinders 6 is to allow the transfer of water or a water-nutrient mixture from the reservoir to the grow media and vice versa for rainwater replenishment of the reservoir while the remainder of cylinders 6 provide the strength needed to support platform 4, grow media, and plants. The number 9 used in FIG. 2 refers to a mesh or screen type material that is applied to the interior of the cylinder 6 and employed to contain the grow media within the cylinder 6 while allowing the transfer of water or a water-nutrient mixture through openings 7 and upwardly via grow media within cylinders 6 to additional grow media (not shown) positioned on and above the platform 4. In contrast and as an alternative, the number 9' in FIG. 2 illustrates a cylinder 6 manufactured with integrated openings 7 that prevent the outward movement of grow media from cylinder 6 into the reservoir, while the number 9" illustrates a mesh or screen type material applied to the outside surface of cylinder 6, preventing grow media from entering the reservoir through openings 7 while allowing the transfer of water or a water-nutrient mixture to additional grow media (not shown) on and above the platform. The number, size, perimeter configuration, spatial positioning of one relative to the others, and wall thickness dimension of cylinders 6 may be different from that shown in FIG. 2 and still be considered to be within the spirit and scope of the present invention.

Figure 3:
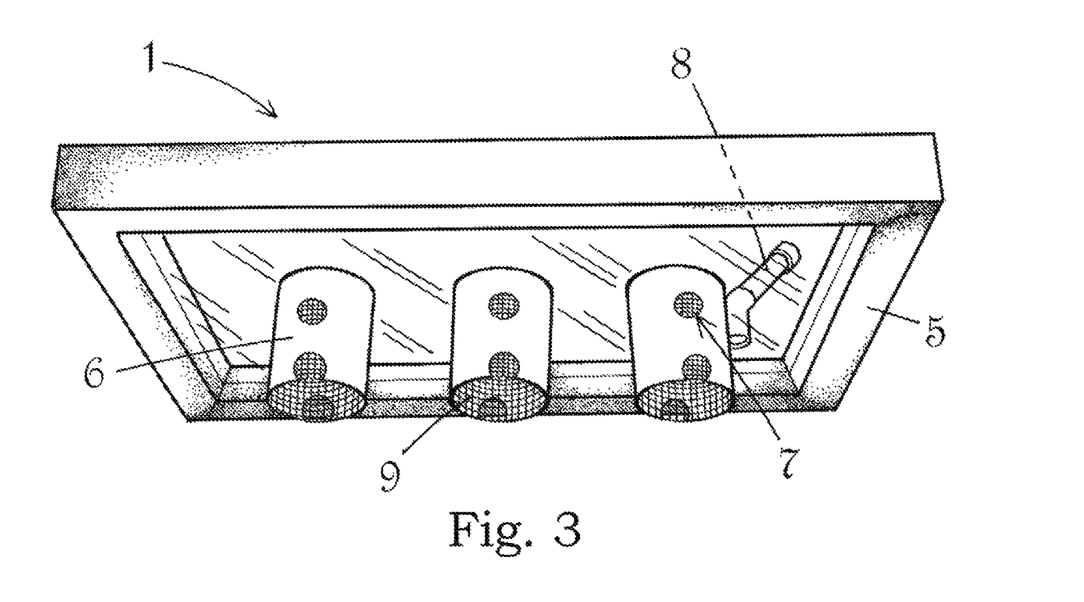
FIG. 3 is a perspective view from the bottom of the present invention insert assembly in FIG. 1 showing three cylinders under a platform, all having interior mesh material and collectively supporting the platform while it supports the grow media and an open space is created below the platform for use as a water or a water-nutrient mixture reservoir, and also showing gasket material around the platform that prevents the grow media supported by the platform from falling down around the platform perimeter and into the reservoir.

FIG. 3 is a perspective view from the bottom of the first preferred embodiment 1, further illustrating the relationship between its main components. Fill-tube 8 is sealed to a small hole (not numbered) in the top of the platform 4 and extends above it, but not significantly below platform 4, while cylinders 6 are sealed to larger holes (not numbered) in platform 4 and extend below it. The tops of cylinders 6 are preferably flush with the top surface of platform 4, but not limited thereto. Cylinders 6 support platform 4 while simultaneously creating a chamber between the bottom of platform 4 and the interior space in drum 2 below platform 4, which then becomes a reservoir for water or a water-nutrient mixture that is fed in a wicking manner to plant roots above platform 4 via grow media in cylinders 6. Gasket material 5, around the perimeter edge of platform 4, compensates for irregularities in the container wall while maintaining a seal between the outer edge of the platform 4 and the interior wall of the container (drum 2), the main function of which is to prevent grow media from falling below the platform 4 and into the reservoir maximizing the volume in drum 2 available for water or a water-nutrient mixture. However, in larger containers placed outdoors, open gasket material 5 can be used to assist rainwater replenishment of the reservoir below platform 4. A mesh material (9, 9', 9", or other) can be fixed across openings 7 in cylinders 6, as well as the lower open end of cylinders 6 (see FIG. 9) to prevent grow media from exiting the interior of cylinders 6 and entering the reservoir area below platform 4, or in the alternative a cap 12 or plug 13 may be used over the lower end of one or more cylinders 6. A separate mesh material 9 or 9" can be used in association with cylinders 6, or integrated perforations 9' that are part of the wall of cylinders 6 will also allow for water transference from reservoir to grow media positioned above platform 4. The cylinders 6 will also each preferably have at least one opening 7 placed along their bottom edge to eliminate any water in the bottom of the reservoir from being wasted, providing a means for transferring all of it upwardly through the grow media in the cylinders 6 and above the platform 4 via the wicking effect.

When a cap (12 or other) or plug (13 or other) is used over the lower open end of cylinders 6, it should have a small height dimension to maximize use of all water or water-nutrient mixture in reservoir, and may also have an indentation or notch to assist this same purpose.

Figure 4:
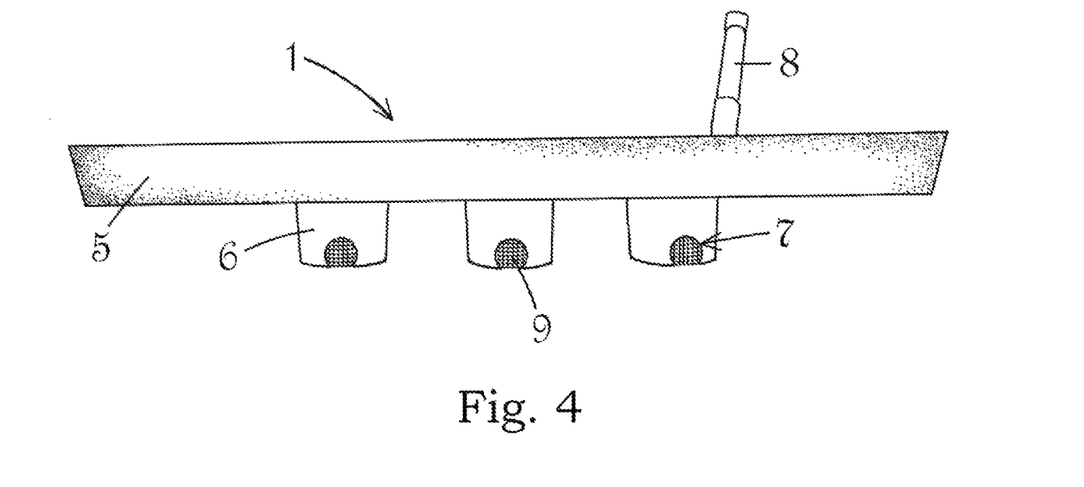
FIG. 4 is a side view of the present invention insert assembly in FIGS. 1 and 3, showing three cylinders designed with water transfer ports through their walls, with the cylinders extending below the gasket material and a fill tube extending above the gasket material, the cylinders each having at least one opening placed along their bottom edge to eliminate any water in the bottom of the reservoir from being wasted, providing a means for transferring all of it upwardly through the grow media in the cylinders and above the platform via the wicking effect.

FIG. 4 is a side view of the most preferred embodiment 1 of the present invention, further illustrating the relationship between its main components. Fill-tube 8 preferably extends above the platform 4, but not visibly below platform 4. FIG. 4 also shows gasket material 5 positioned around the perimeter of the platform 4, and cylinders 6 extending below platform 4. Similar to the mesh material 9 in FIGS. 1 and 3, in FIG. 4 the number 9 also shows the mesh material being used on the interior surface wall of the cylinders 6 as containment for the grow media (not shown) used therein. An opening 7 placed at the lower end of each cylinder 6 allows all water or water-nutrient mixture (not shown) from the reservoir in drum 2 to be transferred through the grow media contained inside cylinders 6 upwardly to plant roots positioned above platform 4. The thickness of gasket material 5 may be different from that shown in FIG. 4, as long as it effectively fulfills its sealing and fluid transfer functions.

Figure 5:
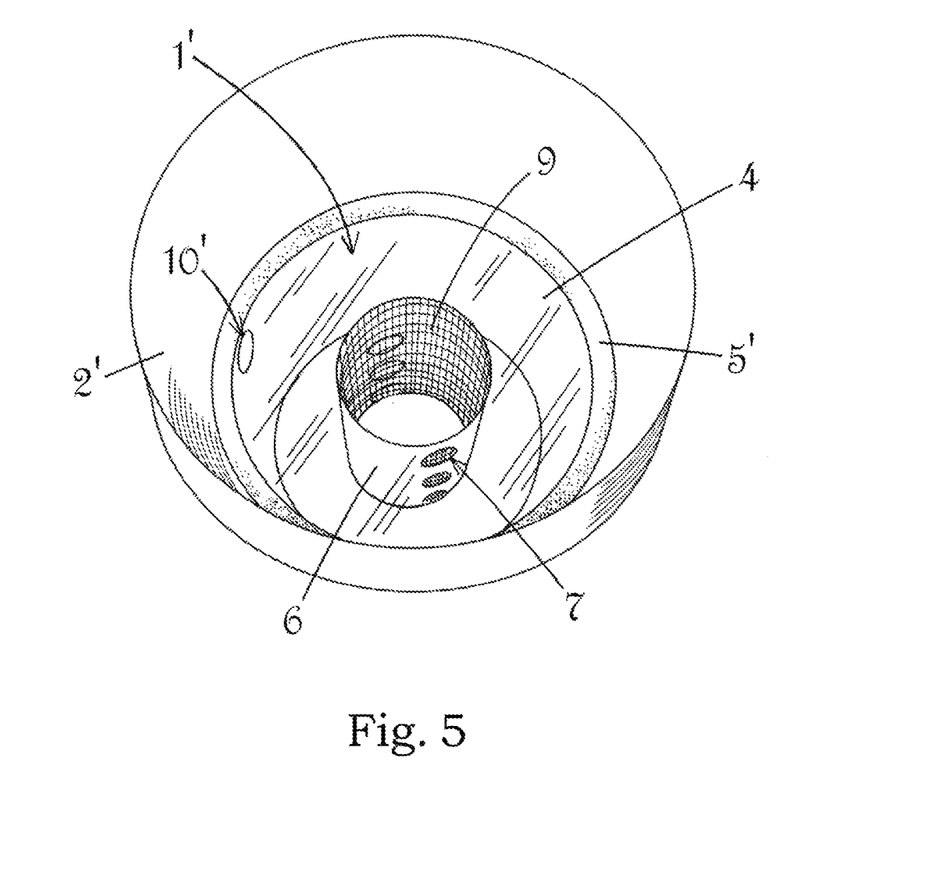

FIG. 5 is a perspective view from the top of a second preferred embodiment 1' of the present invention inserted into a 5-gallon bucket 2' that together create a plant-growing container. The purpose of the second preferred embodiment 1' is to create a means by which a user can easily convert a 5-gallon bucket 2' into a self-watering, plant-growing container, particularly those 5-gallon buckets 2' perhaps originally used to contain paint, grout, spackling compound or other commonly used construction material, to repurpose them instead of discarding them into a landfill. The second preferred embodiment 1' consists of a platform 4, gasket material 5', a cylinder 6, openings 7 in the wall of cylinder 6 and a mesh material 9 added to or as an integrated part of the wall of cylinder 6 to contain added grow media within cylinder 6 and prevent it from entering the reservoir delivered below platform 4 in 5-gallon bucket 2'. FIG. 5 further shows an overflow prevention member 10' that regulates the water level in the reservoir to eliminate root damage caused by oversaturation of grow media (not shown) on or above platform 4. Water or a water-nutrient mixture (not shown) can be added to the reservoir below platform 4 through the overfill prevention member 10' or directly to the grow media (not shown) either artificially or naturally via rainwater. Due to the reduced size of container 2', though an open celled gasket material 5 can be used, a closed gasket material 5' is preferred around the perimeter edge of platform 4. Neither a fill tube 8 nor an open cell gasket material 5 is needed for proper operation of the smaller second preferred embodiment 1'. Also, although not limited thereto, FIG. 5 shows six openings 7 in cylinder 6. The size, shape, number and positioning of cylinder 6 and its openings 7 are not limited to that shown in FIG. 5. Although FIG. 5 appears to show platform 4 to be made from transparent material, transparent material is not a critical feature of platform 4.

Figure 6:
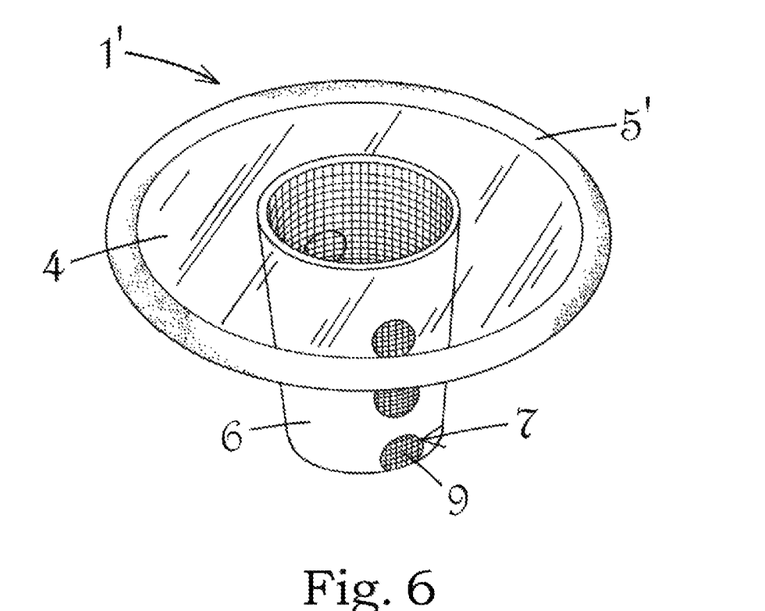
FIG. 6 is a perspective view from the top of the second preferred embodiment of the present invention without the 5-gallon bucket and showing its platform surrounded by a gasket material, a cylinder with a top opening extending from and below the platform, the platform having an opening mated to the cylinder's top opening in a manner that prevents entry of grow media into the bottom reservoir portion of the 5-gallon bucket, the cylinder also having side openings covered by mesh to retain grow media within the cylinder acting as the wicking agent to transfer the water or water-nutrient mixture upwardly to the grow media on and above the platform.

FIG. 6 is a perspective view from the top of the second preferred embodiment of the present invention 1' showing its main components. The purpose of platform 4, as with the first preferred embodiment 1, is to support a grow media that holds plant roots so as to promote plant growth and root development. A closed celled gasket material 5' creates a seal between the perimeter edge of platform 4 and the interior wall of bucket 2' while preventing grow media (not shown) from falling down below platform 4 into the reservoir (although an open cell gasket material 5 can also be used). Cylinder 6 has a top opening that is mated to an opening (not numbered) through platform 4 and extends downward vertically from platform 4, providing support for platform 4 while simultaneously creating a chamber between platform 4 and the bottom interior surface of bucket 2' that functions as a reservoir for storing water or a water-nutrient mixture (not shown). The opening in the center of platform 4 communicates with the open top end of cylinder 6 and provides a means to receive and become filled with grow media (not shown), which then acts as a wicking agent for a continual and steady transference of water or a water-nutrient mixture from the reservoir upwardly above the platform 4 to the plant roots for optimal plant growth. Platform 4 may be made from any solid material, transparent or opaque. Also gasket material 5' should have some resiliency for a good fit of platform 4 within a bucket 2' or other container that prevents the transfer of grow media (not shown) on or above the platform 4 from entering the reservoir area below platform 4. In addition, the size of the holes in mesh 9 and the size, number, shape, and placement of openings 7 in cylinders 6 should allow needed upward transfer of water or a water-nutrient mixture for optimal plant growth while allowing minimal (preferably none) grow media to enter the reservoir below platform 4. Also, as shown in FIG. 6, a bottom opening 7 is preferred along the bottom edge of cylinder 6 to allow use of all water or water nutrient mixture in the reservoir below platform 4, if needed.

Figure 7:
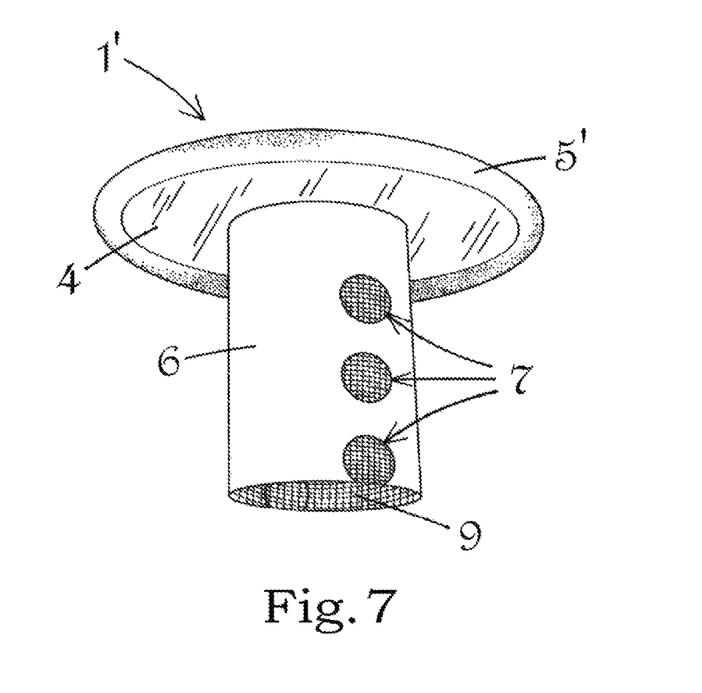
FIG. 7 is a perspective view from the bottom of the second preferred embodiment of the present invention showing gasket material around the platform and further illustrating the relationship of the platform to the cylinder, with one cylinder extending from and below the platform while providing a means of platform support, an opening at the top of the cylinder used to place grow media into the cylinder and creating means through which the wicking effect can take place, and the cylinder wall openings which may be capped, plugged or designed with mesh material (see FIG. 9) to contain the grow media and prevent it from entering the reservoir area around the cylinder.

FIG. 7 is a perspective view from the bottom of the second preferred embodiment 1' of the present invention, further revealing the structure of its main components. Designed to repurpose a 5-gallon bucket (or other bucket of similar size), the second preferred embodiment 1' consists of a platform 4, closed cell gasket material 5', one cylinder 6, openings 7 in the wall of cylinder 6 and a mesh material 9 extending inside cylinder 6 across openings 7. Although the mesh material 9 is shown in FIG. 7 around the interior surface of cylinder 6, such structure is not critical. In the alternative (and similar to that shown in FIG. 2), it is contemplated for the mesh material 9 to be applied to the interior or exterior of cylinder 6, or for small openings to be integrated directly into the cylinder wall during manufacturing of cylinder 6 as long as it serves the same function of containing and separating grow media from the water or water-nutrient mixture, yet allowing transfer of fluid to and from the grow media. At least one opening 7 is preferably placed at the bottom edge of the cylinder 6 (as shown in FIG. 7) and positioned against the interior bottom surface of bucket 2' to allow all of the water or water-nutrient mixture in the reservoir to be absorbed into the grow media with cylinder 6 and transferred, via the wicking effect, upwardly through the grow media above platform 4 to the plant roots.

Figure 8:
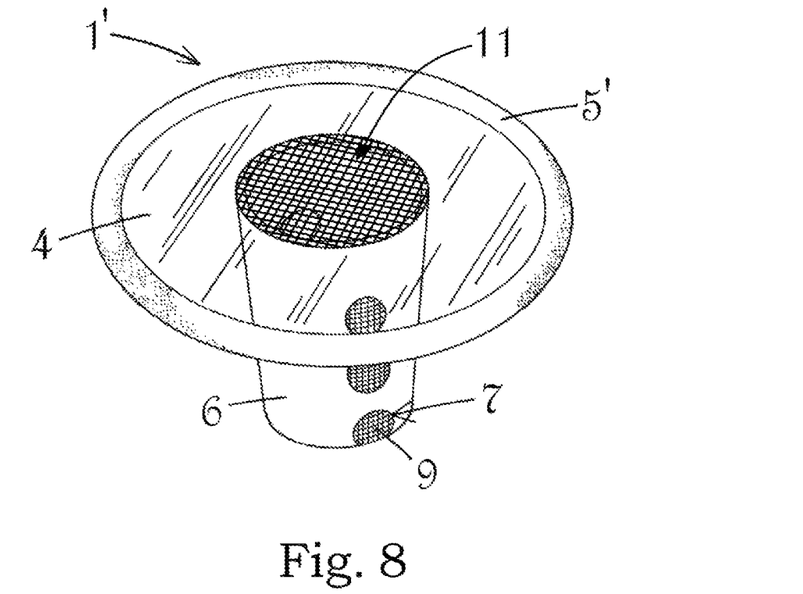
FIG. 8 is a perspective view from the top of the second preferred embodiment of the present invention without the 5-gallon bucket, similar to that shown in FIG. 6 and also showing a mesh barrier that can be placed over the top opening in the cylinder to help prevent root growth from entering the grow media within the cylinder and potentially restricting the ability of the grow media to produce the needed wicking effect, thereby avoiding the slowing down or stopping of water or water-nutrient mixture transfer from the reservoir to the plant roots on and above the platform. The structural characteristic of side openings in the cylinder covered by mesh to retain grow media within the cylinder remains the same.

FIG. 8 is a perspective view from the top of the second preferred embodiment 1' of the present invention showing its main components. Platform 4, as with the first preferred embodiment 1, supporting grow media that holds plant roots so as to promote plant growth and root development, a closed celled gasket material 5' creating a seal between the perimeter edge of platform 4 and the interior wall of bucket 2', and cylinder 6 having a top opening that is mated to an opening through platform 4 while extending downward vertically from platform 4. In addition to these components, FIG. 8 also shows a root growth barrier 11 to be added to the top of the cylinder 6 in the second preferred embodiment 1' of the present invention when this assembly is used to grow plants that normally have a deep growing tap root that may cause a restriction in the transfer of the water or water-nutrient mixture through the grow media if said tap root were allowed to over develop within the grow media (not shown) in cylinder 6. The root growth barrier 11 can be manufactured using the same mesh material 9 positioned over openings 7, or as a cover having small openings integrated directly into it so long as it does not impede the transference of water or a water-nutrient mixture from the reservoir, through the grow media and to the plant roots on and above platform 4. This root growth barrier 11 can be added by the user after grow media is placed in cylinder 6 and is only contemplated for use where type of plants dictate such use.

Figure 9:
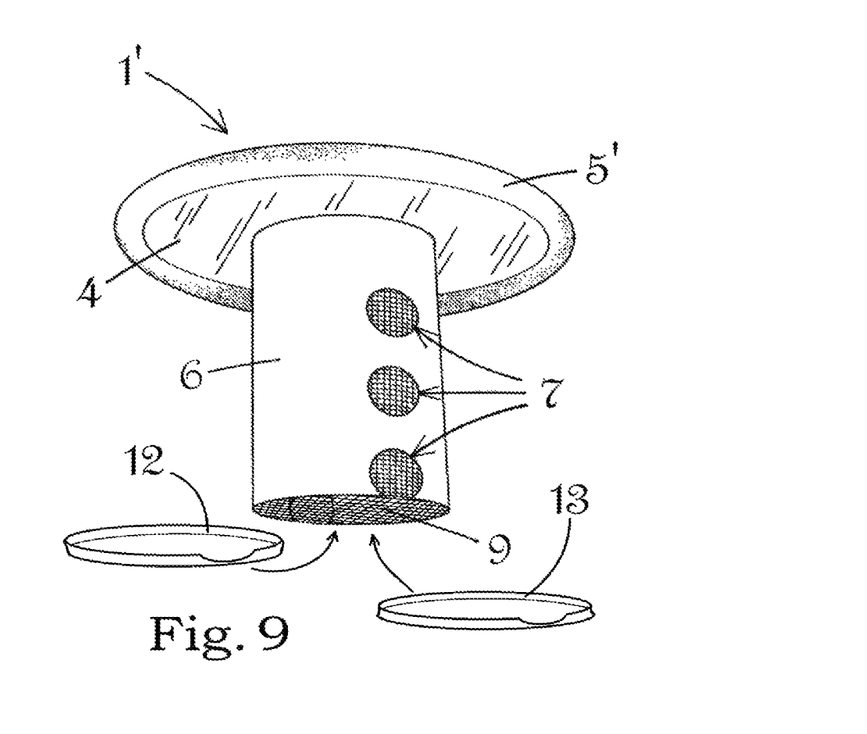
FIG. 9 is a perspective view from the bottom of the second preferred embodiment of the present invention similar to that shown in FIG. 7, and also showing three alternatives for sealing the bottom open end of the cylinder when needed, including a mesh on the bottom open end of the cylinder providing a means to retain grow media within the cylinder, and also a cap and a plug each designed to perform the same function while continuing to allow water or a water-nutrient mixture to pass through easily into the grow media to be transferred upwards via the wicking effect to the plant roots on an above the platform.

FIG. 9 is a perspective view from the bottom of the second preferred embodiment 1' of the present invention, further revealing three additional components, each alternatively positioned to cover the bottom opening of cylinder 6. Designed to repurpose a 5-gallon bucket (or other bucket of similar size), the second preferred embodiment 1' consists of a platform 4, closed cell gasket material 5', one cylinder 6, openings 7 in the wall of cylinder 6 and a mesh material 9 extending inside cylinder 6 across openings 7 with the addition of mesh material 9 over the lower open end of cylinder 6 as a means to prevent grow media from entering into the reservoir (not shown) containing water or a water-nutrient mixture (not shown). In the alternative, FIG. 9, also shows a cap 12 and a plug 13 which could be substituted in place of mesh material 9 while serving the same function.

I claim:

1. A self-regulating, wicking insert assembly for plant growing use in association with a reservoir-providing waterproof container having side wall structure between an open top end and a closed bottom end, water or water-nutrient, and grow media, said insert assembly comprising:
   a) a substantially planar and horizontally extending platform with a perimeter edge and a thickness dimension;
   b) at least one vertically extending cylinder permanently fixed to and downwardly depending from said platform and positioned at least in part below said platform, said at least one cylinder also having an open top end, an open bottom end, a cylinder wall between said top end and said bottom end with an interior surface and an exterior surface, said cylinder wall also having small mesh openings therethrough;
   c) at least some of said small mesh openings associated with said cylinder wall-positioned adjacent to said bottom end of said cylinder; and
   d) gasket material outwardly depending from said perimeter edge of said platform and extending completely around said perimeter edge, said gasket material having a thickness dimension greater than said thickness dimension of said platform and extending above, below, and outwardly beyond said perimeter edge of said platform, wherein when said platform is placed into the reservoir-providing waterproof container having side wall structure between an open top end and a closed bottom end, and the reservoir-providing waterproof container has a cross-sectional configuration similar in size and shape to that of said perimeter edge of said platform, said bottom end of said at least one cylinder engages the closed bottom end of the reservoir-providing waterproof container while said gasket material engages the side wall structure of the reservoir-providing waterproof container, sealing any gaps between said perimeter edge and the side wall structure against downward movement of grow media therethrough, said at least one cylinder and gasket material together securing said platform into a usable position within the reservoir-providing waterproof container, and when grow media is placed on and above said platform and also into said at least one cylinder, and when water or water-nutrient is placed into the reservoir-providing waterproof container below said platform, the water or water-nutrient passes through said small mesh openings and into said at least one cylinder, thereafter wicking upward into the grow media above said platform for plant growing use.

2. The self-regulating wicking insert assembly of claim 1 wherein said gasket material further comprises open cell gasket material.

3. The self-regulating wicking insert assembly of claim 1 wherein said gasket material further comprises closed cell gasket material.

4. The self-regulating wicking insert assembly of claim 1 further comprising at least one fill-tube extending through said platform.

5. The self-regulating wicking insert assembly of claim 1 wherein said small mesh openings in said at least one cylinder are integral with said cylinder wall.

6. The self-regulating wicking insert assembly of claim 1 wherein said small mesh openings in said at least one cylinder are formed by mesh material secured against said interior surface of said cylinder wall.

7. The self-regulating wicking insert assembly of claim 1 wherein said small mesh openings in said at least one cylinder are formed by mesh material secured against said exterior surface of said cylinder wall.

8. The self-regulating wicking insert assembly of claim 1 further comprising mesh material covering said open top end of said at least one cylinder, reducing plant root growth downward into said at least one cylinder.

9. The self-regulating wicking insert assembly of claim 1 further comprising a cap on said bottom end of said at least one cylinder, preventing exit of grow media from said bottom end of said at least one cylinder.

10. The self-regulating wicking insert assembly of claim 1 further comprising a plug in said bottom end of said at least one cylinder, preventing exit of grow media from said bottom end of said at least one cylinder.

11. The self-regulating wicking insert assembly of claim 1 further comprising mesh material across said bottom end of said at least one cylinder, preventing exit of grow media from said bottom end of said at least one cylinder.

12. A self-regulating, wicking plant-watering assembled system comprising:
   a) the insert assembly of claim 1;
   b) the reservoir-providing waterproof container with a closed bottom end holding water or water-nutrient, an open top end, and an interior side wall structure between said open top end and said closed bottom end with a cross-sectional configuration similar in shape and size to that of said perimeter edge of said platform, and providing a tight fit of said gasket material against said interior side wall structure when said insert assembly is positioned within said reservoir-providing waterproof container and said bottom end of said at least one cylinder engages said closed bottom end of said reservoir-providing waterproof container; and
   c) grow media positioned on and above said platform and also completely filling said at least one cylinder, wherein said water or water-nutrient in said reservoir-providing waterproof container passes through said small mesh openings and into said at least one cylinder, thereafter wicking upward into said grow media above said platform for plant growing use.

13. The self-regulating, wicking plant-watering assembled system of claim 12 wherein said reservoir-providing waterproof container is one-half of a 55-gallon drum split longitudinally.

14. The self-regulating, wicking plant-watering assembled system of claim 12 wherein said reservoir-providing waterproof container is a bucket having an approximate 5-gallon capacity.

15. The self-regulating, wicking plant-watering assembled system of claim 12 wherein said reservoir-providing waterproof container further comprises an over-fill prevention hole positioned at an elevation below said platform.

16. The self-regulating, wicking plant-watering assembled system of claim 12 further comprising an elevating stand supporting said reservoir-providing waterproof container.

17. The self-regulating, wicking plant-watering assembled system of claim 12 further comprising mesh material covering said open top end of said at least one cylinder, reducing plant root growth downward into said at least one cylinder.

18. The self-regulating, wicking plant-watering assembled system of claim 12 further comprising a cap on said bottom end of said at least one cylinder, preventing exit of grow media from said bottom end of said at least one cylinder.

19. The self-regulating, wicking plant-watering assembled system of claim 12 further comprising a plug in said bottom end of said at least one cylinder, preventing exit of grow media from said bottom end of said at least one cylinder.

20. The self-regulating, wicking plant-watering assembled system of claim 12 further comprising mesh across said bottom end of said at least one cylinder, preventing exit of grow media from said bottom end of said at least one cylinder.

* * * * *